May 20, 1941.   W. BAIER ET AL   2,242,844
CATCH FOR SLIDING ROOFS FOR MOTOR VEHICLES
Filed April 8, 1939   2 Sheets-Sheet 2
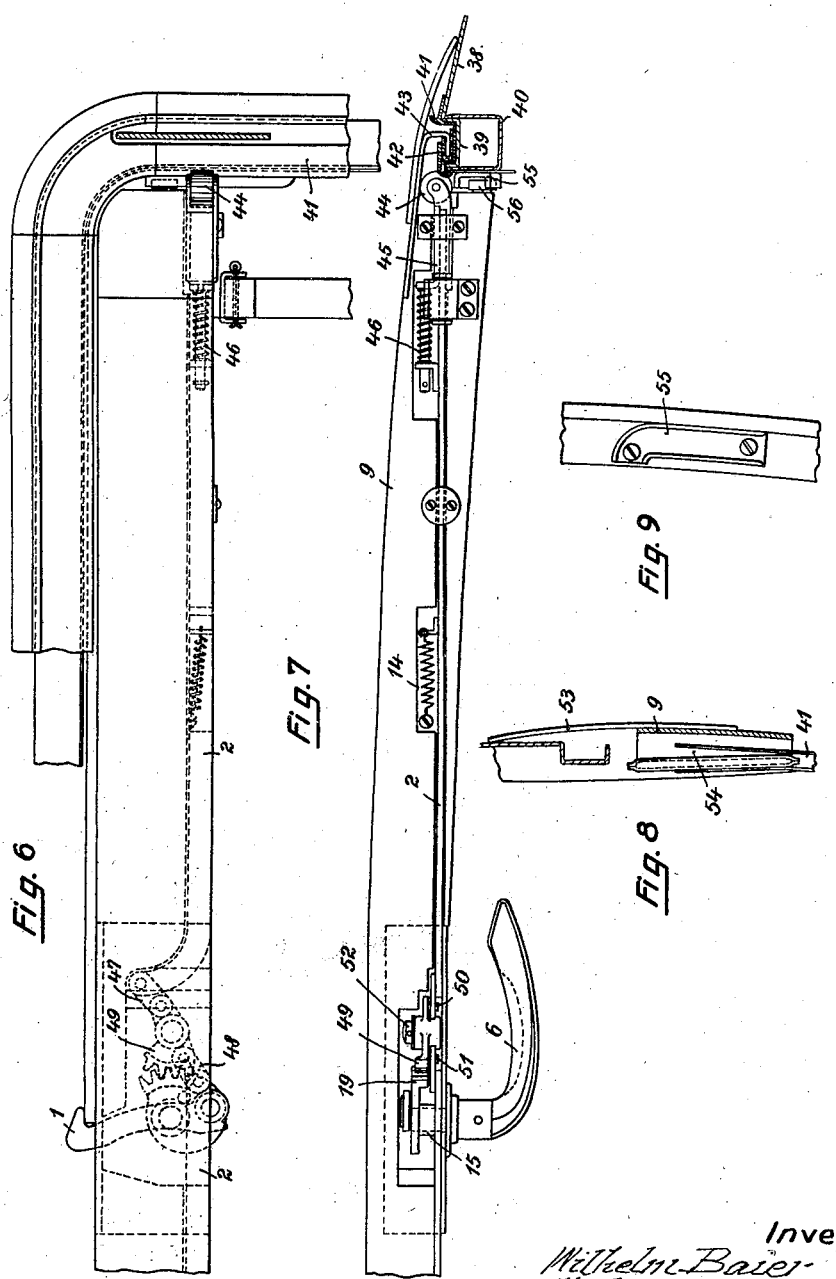
Inventor
Wilhelm Baier
Walter Baier
By
Attorney Patented May 20, 1941

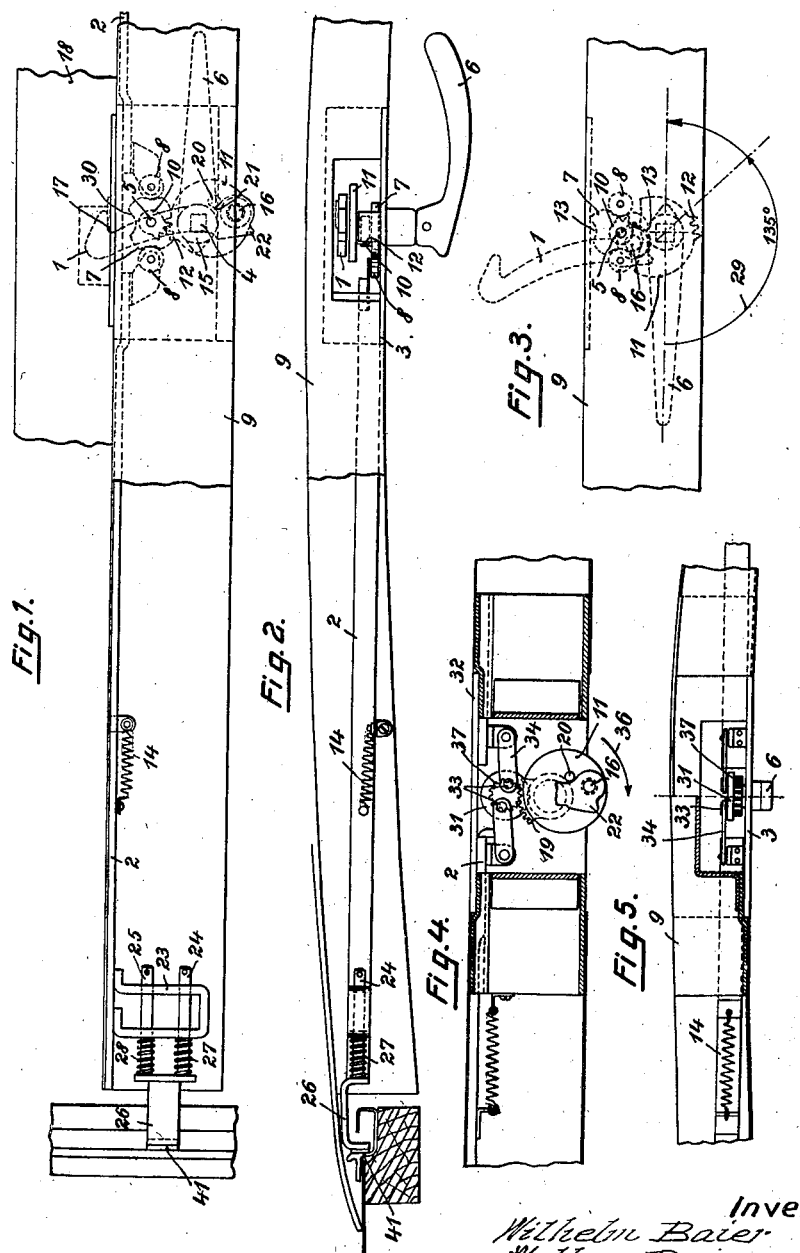

2,242,844

UNITED STATES PATENT OFFICE 2,242,844

CATCH FOR SLIDING ROOFS FOR MOTOR VEHICLES

Wilhelm Baier and Walter Baier, Stockdorf, near Munich, Germany

Application April 8, 1939, Serial No. 266,828
In Germany May 4, 1938

6 Claims. (Cl. 292—8)

This invention relates to a sliding roof for motor vehicles, and more particularly passenger cars, and has for its object to provide improvements in conjunction with the locking and retaining means for a roof of this kind.

It has already been proposed heretofore, by the operation of a handle, to effect simultaneously the closing of the roof and the locking of the same in position by a braking action taking effect in conjunction with lateral guide rails. The known embodiments, however, are accompanied by the disadvantage that the braking action already enters into full effect before the closing movement has been completed.

In comparison with these known arrangements a substantial improvement is afforded by the invention insofar as upon actuation of the handle at first the catch member is moved into position and the braking action is not initiated until the catch has almost reached the extreme position, being completed simultaneously with or following the closing movement. Preferably the arrangement is such that the handle is turned to the extent of 180° and the braking action is allowed to be effective only over the last 45° thereof, having no effect over the initial distance of 135°. The operating member which moves the brake rods is accordingly actuated by means of a lag mechanism, such as notches, toothed gearing or the like, only after a certain idle movement. In the case of toothed gearing the teeth can be provided internally or externally.

The catch member is actuated in the conventional manner by means of an eccentric, which is mounted on the spindle of the handle. As operating member for the brake there can be employed a cam having four curves, a basquell disc or the like. The cam or the disc is preferably arranged outside of the range of the catch member, as the operating means are then not obstructed with regard to their height in the head rail by the path of movement of the catch, and all single parts can be produced solely with consideration to strength and cheap production.

Various embodiments of the invention are illustrated by way of example in the accompanying drawings, in which Fig. 1 is a plan view of Fig. 2, Fig. 2 being a view of the front beam, partially in section, as seen when seated in the car and looking towards the front.

Fig. 3 is a plan view showing the levers in a different position.

Fig. 4 is a plan view of a modified form of the brake drive,

Fig. 5 being an elevational view of Fig. 4.

Fig. 6 is a plan view of a still further embodiment, and

Fig. 7 is an elevational view of Fig. 6.

Figs. 8 and 9 illustrate details.

The catch member is designated 1. This catch, in the conventional manner, is mounted on an eccentric 11, pivotable about a pin 16, and possesses a curved form, so that in co-operation with a suitable aperture or guide opening 17 in the appertaining front fitting of the head rail 9 it performs upon rotation of the eccentric 11 by means of the handle 6 movements to the front and the side.

The handle below the bearing 15 can be rotated to the extent of 180°. The extreme positions are represented by an abutment 20, which is provided with respect to the catch 1 on the eccentric 11. The arrangement is such that upon entry into the position of closing the eccentric has exceeded the dead point with respect to its direction of pull and in the closed position is secured automatically. This condition is shown in Fig. 1. In this position the abutment 20 abuts against the catch 1 at 21. In the open position (Fig. 3) the abutment 20 is situated behind the projection 22.

An essential feature consists in the fact that during the initial closing movement of the catch 1 the brake rods 2 still remain in the position of release. The brake rods 2 are guided in the member 9 and are furnished at their free inner ends with rollers 8 which, under the action of springs 14, always bear against the cam 7. The cam 7 and eccentric 11 with handle 6 are mounted on a base plate 3. The mounting for the cam 7 is firmly connected to a toothed sector 10, which can be moved into engagement with a sector 12 of the eccentric 11, which is held by the square pin 4. The brake rods 2 are furnished at the outer end with a bearing bracket 23, which consists of strip iron bent in U-form. In the bracket 23 there are guided rods 24 and 25 carrying the actual brake members 26, which under the pressure of the springs 27, 28 bear against the inner wall of the rail 41. The springs 27 and 28 act, however, merely as a buffer in order upon the movement to make allowance more particularly for the form of the cam 7.

The form of the cam 7 is such that in the closed position (Fig. 1) the rollers 8 are more remote from the stud 5 than in the open position (Fig. 3). In order that in the closed position, in which the head rail 9 is pressed firmly against the immovable roof portion 18, the braking mechanism cannot vary automatically the periphery of the cam is furnished with two convex curvatures or recesses 13, which act as indents for the rollers 8 of the brake rods 2. In the position of introduction the rods 2 also bear by way of the rollers 8 in recesses, so that the cam accordingly is preferably of a form which may be said to be substantially that of four-leaf clover. It will be seen from the drawings that for actuating the braking mechanism merely a rotation of the cam is necessary amounting to 90°, whereas for the actuation of the locking means a rotation of 180° is required. In consequence there must be a transmission ratio of 1:2.

If the roof is to be moved out of the open position into the closed position, the handle 6 is turned in the direction of the arrow 29. The two sectors 10 and 12 do not move into engagement with each other until the eccentric 11 has been rotated to the extent of 135°. The first tooth of the sector 12 then engages with the toothed sector 10 of the cam 7, and in consequence of the transmission ratio of 1:2 the cam 7, upon additional rotation of the handle 6 by 45°, is rotated by 90°, and the rollers 8 accordingly move over the curves into the recesses 13. In this condition not only is the roof secured by the catch, but the head rail 9 is also braked automatically.

Upon this movement of 135° the catch 1 has already been withdrawn to such extent that over the remaining 45° it is additionally withdrawn only to the extent of approximately 1-2 mm., since the eccentric passes beyond the dead point so that there will be no automatic release of the fastening means (Fig. 1).

In the embodiment according to Figs. 4 and 5 there is connected to the eccentric 11 a toothed sector 19, which engages at times with a gear wheel 30, which in turn is connected to a disc 31. Disc 31 and gear wheel 30 are mounted on a stud provided in the base plate 3, which latter is integral with the front facing 32. In the plate 3 there is also mounted the handle 6. On the disc 31 there are provided in radially opposite positions two studs 33, each of which is engaged by a link 34. This link is connected to a holding eye 35 in association with the brake rods 2.

The gearing 19 connected to the eccentric 11 is in the form of a sector, in consequence of which upon rotation of the eccentric 11 by 180° only a certain angular distance is transmitted to the disc 31. In the locking and braking position shown in Fig. 4 the sector 19 and the gear wheel 30 are in engagement. Upon rotation in the direction 36 the teeth move out of engagement following an angular movement on the part of the disc 31 amounting to approximately 90° and an angular movement on the part of the disc 11 amounting to approximately 45 to 60°. The brake is accordingly released right at the commencement of the unlocking movement, which is extremely favourable for the manipulation of the roof.

The braking effect is accordingly overcome when the handle 6 has been rotated by merely 90°, so that it is simply necessary to press or pull the handle for the purpose of moving the roof, whereupon by a brief return movement of the handle the roof can be firmly braked in any desired intermediate position, and it is impossible for the same again to slip out of the adjusted position even upon a sudden braking of the vehicle or under the action of a strong wind.

According to Figs. 6 to 9 the vehicle 38 is furnished with a pressed-in channel 39, which can also be reinforced by a welded-on U-section 40. This channel is covered by a profile rail 41, in which there slides the runner 43 of the hoop 9, which runner is faced with leather 42.

At the centre of the head rail there is provided the handle 6, which actuates the brakes assigned on the left and the right to the profile rails 41. These brakes consist of a rubber roll 44 and brake rod 2.

The rubber roll 44 is held by a guide piece 45, which is mounted to be shiftable on the free end of the rod 2 and is acted upon by a spring 46. This spring 46 has the object of providing a resilient buffer. Another spring 14 seeks to draw the brake rods 2 inwards. The brake rods engage by way of links 47, 48 at 50 and 51 with a toothed sector 49, which is mounted to be rotatable on the stud 52.

Owing to the arrangement of the stud 52 to the side of the path of movement of the catch 1 the toothed sectors are not subject to a limitation in height and the teeth can be made sufficiently strong. With the sector 49 there cooperates in a certain angular range of oscillation of the handle 6 the sector 19 which is mounted on the stud 15. Above the toothed sector 19 there is provided the eccentric with the catch member.

The new form of locking means takes effect on such lines that in intermediate positions a short angular movement is sufficient for the purpose of firmly braking the roof and securing it in any desired position towards the front or the rear. If the roof is moved into the closed position the closing movement is practically completed before the brake is caused to operate. This adaptation of the parts or movements to one another provides the advantage that the catch member does not require to operate in opposition to the braking force and the head rail member can move without obstruction into the extreme position, so that a tight closure can be obtained by reason of the overlapping resilient plate 53. This plate is secured to the top of the head rail 9, and can also represent the front end of the roof material. At the front the guide rail 41 is widened out downwards, as disclosed by Fig. 8. Within the range of this widened portion 54 the runner 42, 43 can follow a downward movement of the front edge of the head rail enforced by the curve 55. The form and the arrangement of the roll 56 and the curve are shown in Figs. 6, 7 and 9. Upon commencement of the rearward movement of the head rail 9 the plate 53 is lifted by the angular amount 54, so that the cover plate 53 is unable to rub against the side rails 41 or the roof portion 38 and thus possibly be damaged at the front.

The brake rods and brake rolls are situated in the rear of the head rail 9, whereby the roll 56 may be situated more towards the front and sufficient space remains for an arcuate form of the roof aperture.

What we claim as new and desire to secure by Letters Patent is:

1. In a sliding roof for motor vehicles, a catch member for securing the roof in the closed position, braking means for securing the roof in the fully opened and in any intermediate position, a rotatable handle adapted upon its rotation to actuate both the said catch member as well as the said braking means, and transmission means disposed between the said handle and the said catch member and said braking means, said transmission means being operable by the handle and including an element to actuate the catch member and also including means for actuating the brake means, the means for actuating the brake means in the movement of the handle being normally free of handle influence, and actuated by the handle in a movement thereof which is smaller than that movement of the handle required for the actuation of the element controlling the catch member.

2. In a sliding roof for motor vehicles, a catch member for securing the roof in the closed position, braking means for securing the roof in the fully opened and in any intermediate position, a rotatable handle adapted upon its rotation to actuate both the said catch member as well as the said braking means, and transmission means disposed between the said handle and the said catch member and said braking means, the said transmission means including means for producing an idle movement in association with the actuation of the said catch member for the purpose of bringing about a complete actuation of the said braking means by a rotation of the said handle in one direction only which is smaller than that required for the actuation of the said catch member.

3. In a sliding roof for motor vehicles, a catch member for securing the roof in the closed position, braking means for securing the roof in the fully opened and in any intermediate position, a rotatable handle adapted upon its rotation to actuate both the said catch member as well as the said braking means, and toothed gearing including at least one toothed sector disposed between the said handle and the said catch member and said braking means for producing an idle movement in association with the actuation of the said catch member for the purpose of bringing about a complete actuation of the said braking means by a rotation of the said handle in one direction only which is smaller than that required for the actuation of the said catch member.

4. In a sliding roof for motor vehicles, a catch member for securing the roof in the closed position, braking means for securing the roof in the fully opened and in any intermediate position, a rotatable handle adapted upon its rotation to actuate both the said catch member as well as the said braking means, a four-curve cam in association with the said handle, brake rods connected to the said braking means and bearing against the said cam, springs pressing the said rods against the said cams, and means for producing an idle movement in association with the actuation of the said catch member for the purpose of bringing about a complete actuation of the said braking means by way of the said cam and the said brake rods by a rotation of the said handle in one direction only which is smaller than that required for the actuation of the said catch member.

5. In a sliding roof for motor vehicles, a catch member for securing the roof in the closed position, braking means for securing the roof in the fully opened and in any intermediate position, a rotatable handle adapted upon its rotation to actuate both the said catch member as well as the said braking means, a studded disc in association with the said handle, brake rods connected to the said braking means, links connecting the said studded disc and the said brake rods, and means for producing an idle movement in association with the actuation of the said catch member for the purpose of bringing about a complete actuation of the said braking means by way of the said disc, the said brake rods and the said links by a rotation of the said handle in one direction only which is smaller than that required for the actuation of the said catch member.

6. In a sliding roof for motor vehicles, a catch member for securing the roof in the closed position, braking means for securing the roof in the fully opened and in any intermediate position, a handle rotatable in one direction only through 180° and adapted upon its rotation to actuate both the said catch member as well as the said braking means, and transmission means disposed between the said handle and the said catch member and said braking means, the said handle by way of the said transmission means actuating the said braking means only over the final 45° of its movement.

WILHELM BAIER.
WALTER BAIER.